United States Patent
Suzuki et al.

(10) Patent No.: US 12,181,306 B2
(45) Date of Patent: Dec. 31, 2024

(54) VEHICLE CONTROL DEVICE

(71) Applicant: Hitachi Astemo, Ltd., Hitachinaka (JP)

(72) Inventors: Motomune Suzuki, Ibaraki (JP); Masashi Seimiya, Ibaraki (JP)

(73) Assignee: Hitachi Astemo, Ltd., Ibaraki (JP)

( * ) Notice: Subject to any disclaimer, the term of this patent is extended or adjusted under 35 U.S.C. 154(b) by 0 days.

(21) Appl. No.: 17/626,568

(22) PCT Filed: Jul. 17, 2020

(86) PCT No.: PCT/JP2020/027780
§ 371 (c)(1),
(2) Date: Jan. 12, 2022

(87) PCT Pub. No.: WO2021/020155
PCT Pub. Date: Feb. 4, 2021

(65) Prior Publication Data
US 2022/0260386 A1    Aug. 18, 2022

(30) Foreign Application Priority Data
Aug. 1, 2019    (JP) ................. 2019-141984

(51) Int. Cl.
*G01C 21/00* (2006.01)
*G01C 21/34* (2006.01)
(Continued)

(52) U.S. Cl.
CPC ..... *G01C 21/3833* (2020.08); *G01C 21/3407* (2013.01); *G01C 21/3602* (2013.01); *B60W 60/001* (2020.02)

(58) Field of Classification Search
None
See application file for complete search history.

(56) References Cited

U.S. PATENT DOCUMENTS

2009/0030604 A1    1/2009  Fujita et al.
2015/0314780 A1*  11/2015  Stenneth ............. B60W 30/182
                                              701/1
(Continued)

FOREIGN PATENT DOCUMENTS

EP    2282170 A2 *  2/2011  ............... B60T 7/18
JP    2005-195536 A   7/2005
(Continued)

OTHER PUBLICATIONS

International Search Report, PCT/JP2020/027780, Oct. 27, 2020 (2 pg.).

*Primary Examiner* — Tuan C To
*Assistant Examiner* — David Ruben Pedersen
(74) *Attorney, Agent, or Firm* — Volpe Koenig

(57) ABSTRACT

An object is to reduce the data size of surrounding environment information to be stored. A vehicle control device that includes a processor, a first storage unit, and a second storage unit, and stores route information to a target point, the vehicle control device including: an input device that acquires route information of a vehicle and surrounding environment information around the vehicle; and a short-term storage information processing unit that stores the route information and the surrounding environment information acquired while the vehicle is traveling into the first storage unit as short-term storage information, in which the short-term storage information processing unit calculates a feature degree of the surrounding environment information when storing the route information, and temporarily stores the surrounding environment information in which the feature degree is equal to or greater than a predetermined value into the first storage unit as the short-term storage information.

7 Claims, 12 Drawing Sheets

(51) Int. Cl.
*G01C 21/36* (2006.01)
*B60W 60/00* (2020.01)

(56) References Cited

U.S. PATENT DOCUMENTS

| | | | | |
|---|---|---|---|---|
| 2018/0151066 | A1* | 5/2018 | Oba | B60W 60/0053 |
| 2019/0310627 | A1* | 10/2019 | Halder | B60W 50/14 |
| 2020/0109962 | A1* | 4/2020 | Soni | G06V 10/751 |
| 2020/0116495 | A1* | 4/2020 | Yasui | G08G 1/164 |

FOREIGN PATENT DOCUMENTS

| | | |
|---|---|---|
| JP | 2007-240193 A | 9/2007 |
| JP | 2018-005538 A | 1/2018 |
| WO | 2006/098311 A1 | 9/2006 |

* cited by examiner

SURROUNDING ENVIRONMENT INFORMATION FEATURE DEGREE

|   |   | 310 | 311 | 312 | 313 | 314 | 315 | 316 | 317 | 318 | 319 |
|---|---|---|---|---|---|---|---|---|---|---|---|
| 351 | INVARIANCE | 3 | 3 | 1 | 1 | 3 | 3 | 3 | 3 | 3 | 3 |
| 352 | COLOR | 2 | 2 | 2 | 2 | 2 | 2 | 3 | 1 | 1 | 1 |
| 353 | SHAPE | 2 | 2 | 1 | 1 | 2 | 3 | 3 | 2 | 2 | 2 |
| 354 | TOTAL | 7 | 7 | 4 | 4 | 7 | 8 | 9 | 6 | 6 | 6 |

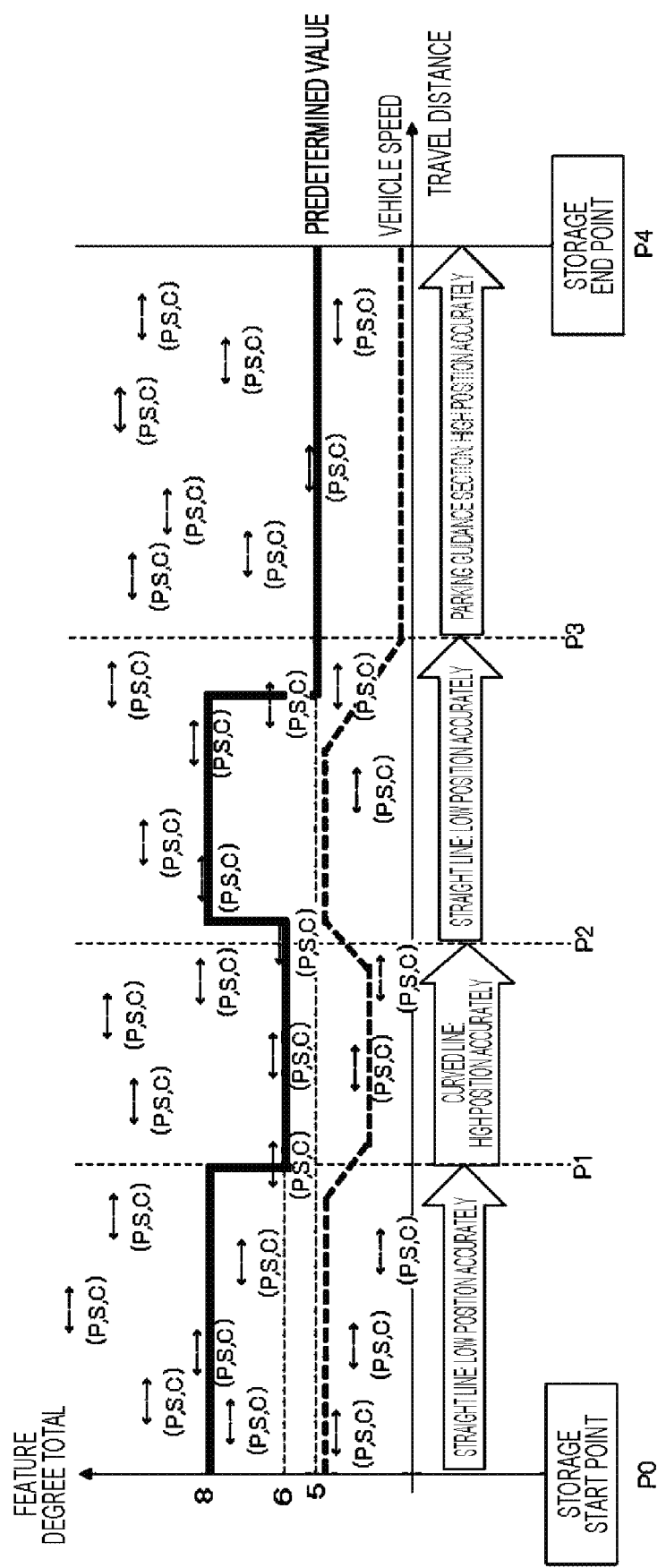

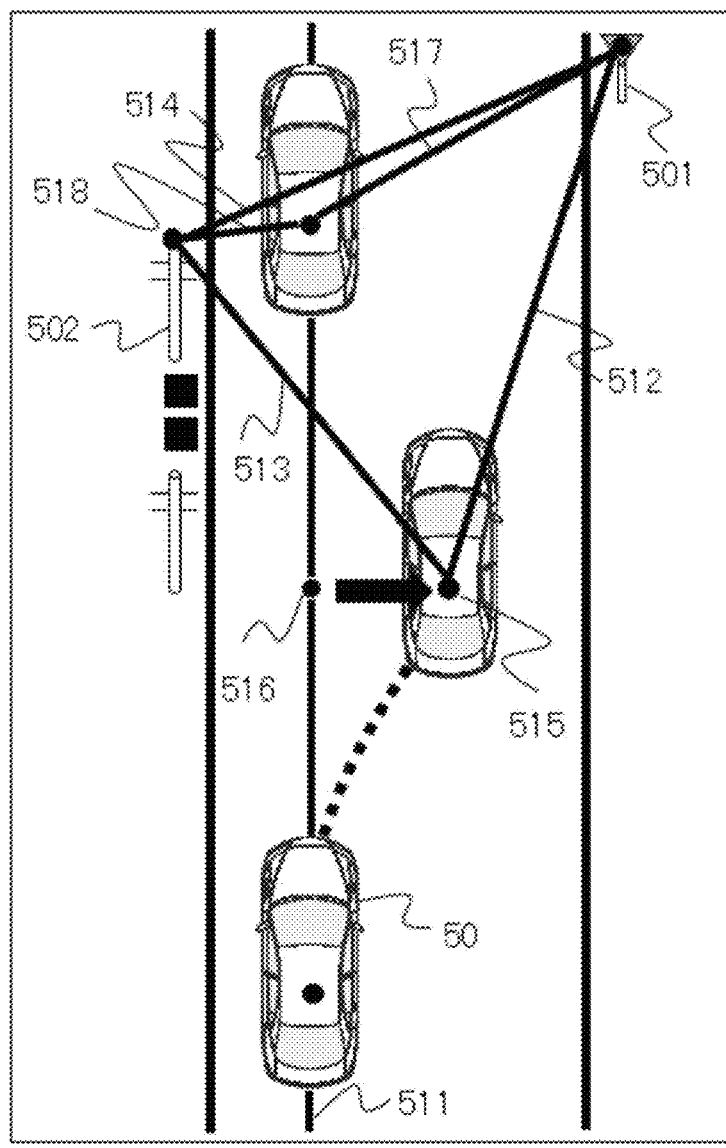

VEHICLE CONTROL DEVICE

TECHNICAL FIELD

The present invention relates to a vehicle control device that performs drive assistance.

BACKGROUND ART

Conventionally, in order to achieve an automatic drive system and a parking assistance system of a vehicle, there has been known a vehicle control device that stores a route on which the vehicle has traveled and surrounding environment information such as objects and white lines around the vehicle, and performs vehicle control using the surrounding environment information stored thereafter.

Examples of the surrounding environment information of the vehicle include position information related to objects such as stationary objects and mobile objects around the vehicle, road surface markings (road surface marking paint) such as white lines and stop lines on the road, and road surface information such as traffic lights and speed signs that exist around the road.

Detection of surrounding environment information of the vehicle requires a vehicle (or external) sensor. As the vehicle sensor, a camera using an image recognition technology, sonar using an ultrasonic technology, and millimeter-wave radar using a radio wave having a short wavelength are effective.

In addition, the route on which the vehicle has traveled can be calculated by detecting own vehicle position information. There are various methods of knowing the own vehicle position depending on the configuration of the system, and it is known a method called dead reckoning, which is to estimate the own vehicle position using own vehicle sensor information such as a wheel speed sensor, a steering angle sensor, an acceleration sensor, and a gyro sensor.

The surrounding environment information may be obtained from the vehicle sensor of the vehicle as described above, or may be obtained from map information stored in a navigation device or the like. The surrounding environment information is sometimes stored until the vehicle arrives at the destination.

By using the stored surrounding environment information, the position of the vehicle on the road can be specified, and displayed on a navigation map screen.

In addition, as in PTL 1, there is known a technology of selecting an important object on a travel route from attribute information of stored object information based on a travel state of the vehicle and displaying the object on a navigation map screen.

CITATION LIST

Patent Literature

PTL 1: JP 2007-240193 A

SUMMARY OF INVENTION

Technical Problem

In PTL 1 described above, map information stored in a navigation device is used as object information and attribute information of the object, and information that has already been stored is used. In the above conventional example, the information to be stored is only position information of the vehicle of the sensors (wheel speed sensor, steering angle sensor, acceleration sensor, gyro sensor, and GPS) attached to the vehicle, and thus the information amount to be stored is not large.

However, in the case of a vehicle guidance route of the automatic drive system or the parking assistance system, in order to store the route, correct the position of the vehicle, and the like, surrounding environment information including object information around the vehicle from a camera using an image recognition technology, sonar using an ultrasonic technology, or millimeter-wave radar using a radio wave having a short wavelength, in addition to the above-described vehicle sensor attached to the vehicle, is required. Object information and road surface information of the surrounding environment information need to be stored as image data or the like. Therefore, the information amount to be stored in a memory becomes enormous. Since the unit price of the memory for storing increases in proportion to its storage capacity, the larger the data size of the surrounding environment information to be stored becomes, the more the manufacturing cost of the vehicle control device increases.

Therefore, the present invention has been made in view of the above problems, and an object thereof is to reduce the data size of the surrounding environment information to be stored by extracting only information having a high feature degree from among object information and road surface information of the surrounding environment information and storing the information in the memory when temporarily storing the object information on the route acquired from the sensor attached to the vehicle at the time of automatic drive or at the time of traveling on a guidance route of the vehicle of the parking assistance system.

Solution to Problem

The present invention is a vehicle control device that includes a processor, a first storage unit, and a second storage unit, and stores route information to a target point, the vehicle control device including: an input device that acquires route information of a vehicle and surrounding environment information around the vehicle; and a short-term storage information processing unit that stores the route information and the surrounding environment information acquired while the vehicle is traveling into the first storage unit as short-term storage information, in which the short-term storage information processing unit calculates a feature degree of the surrounding environment information when storing the route information, and temporarily stores the surrounding environment information in which the feature degree is equal to or greater than a predetermined value into the first storage unit as the short-term storage information.

Advantageous Effects of Invention

According to the present invention, surrounding environment information having a high feature degree is calculated, and a predetermined value of the feature degree of the surrounding environment information is determined according to the travel state of a vehicle. Then, since a vehicle control device 1 does not store surrounding environment information of equal to or less than a predetermined value, the data size of the surrounding environment information to be stored in the first storage unit (memory) can be reduced as compared with the case where the invention is not applied.

The detail of at least one embodiment of the subject matter disclosed in the present description will be mentioned in the accompanying drawings and the following description. Other features, aspects, and effects of the disclosed subject matter will be apparent from the following disclosure, drawings, and claims.

BRIEF DESCRIPTION OF DRAWINGS

FIG. 7 is a graph illustrating an embodiment of the present invention and illustrating an example of a relationship among the feature degree, a predetermined value, and a position of the object on the route.

FIG. 10B is a plan view illustrating an embodiment of the present invention and illustrating an example of a case where the vehicle control device performs vehicle position correction from a plurality of pieces of surrounding environment information on a route.

DESCRIPTION OF EMBODIMENTS

Embodiments of a drive assistance device of the present invention will be described below with reference to the drawings.

Figure 1:
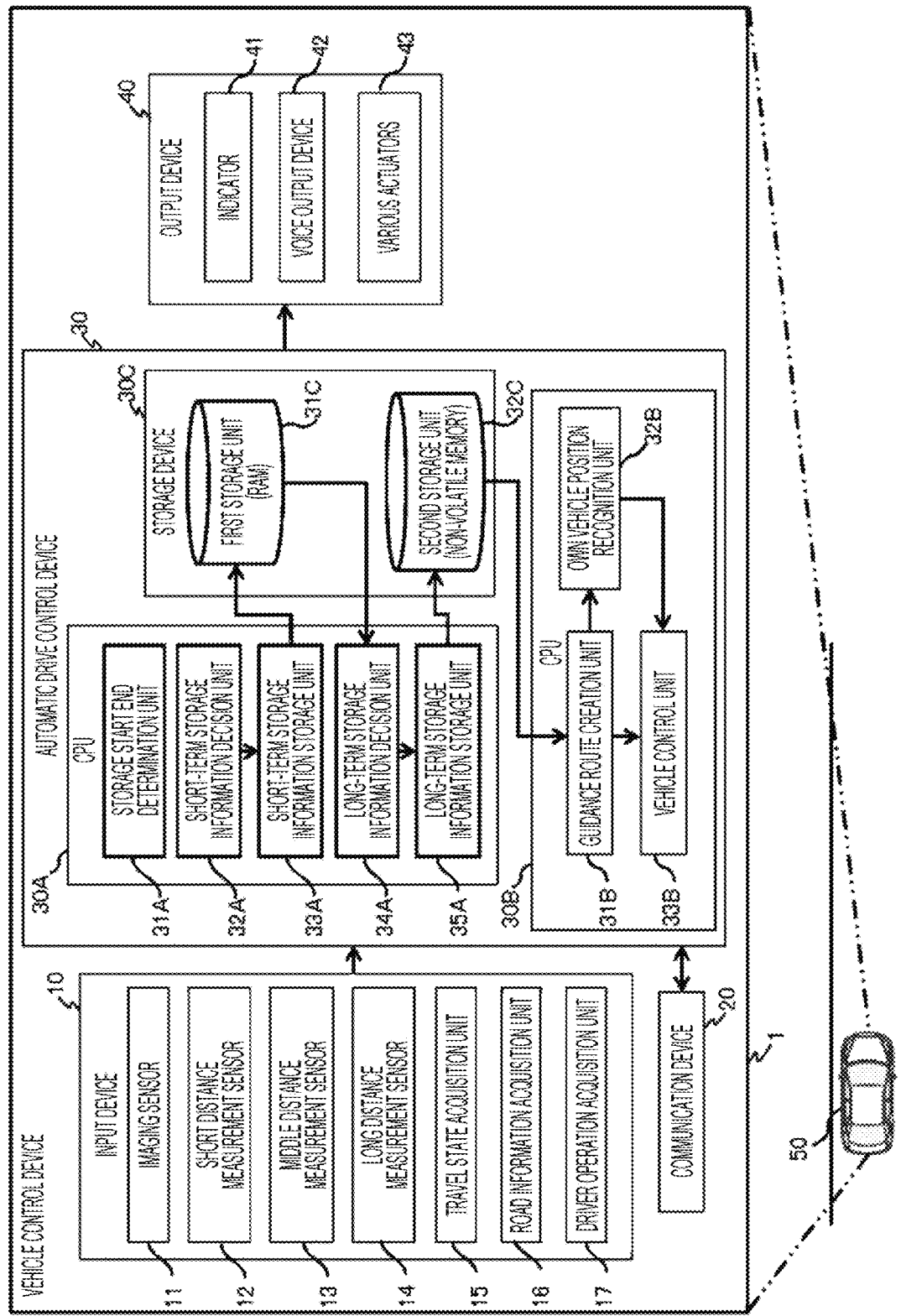
FIG. 1 is a block diagram illustrating an embodiment of the present invention and illustrating an example of functions of a vehicle control device.

FIG. 1 is a functional block diagram of a vehicle control device to which the present invention is applied. The vehicle control device 1 illustrated in FIG. 1 is mounted on a vehicle 50 and performs travel assistance for the vehicle. The vehicle control device 1 can cause the vehicle 50 to automatically travel to a preset target point (storage end point), and if the target point is within a parking frame, can cause the vehicle 50 to automatically park.

As illustrated in FIG. 1, the vehicle control device 1 includes an input device 10, a communication device 20, an output device 40, and an automatic drive control device 30 to which these devices are connected.

The input device 10 includes an imaging sensor 11, a short distance measurement sensor 12, a middle distance measurement sensor 13, a long distance measurement sensor 14, a travel state acquisition unit 15, a road information acquisition unit 16, and a driver operation acquisition unit 17.

The imaging sensor 11 can include, for example, a camera. The imaging sensor 11 is used to image information of objects, white lines, and signs by an imaging element attached around the vehicle 50. The camera includes a plurality of cameras, and a stereo camera including two cameras may be adopted.

Imaging data by the imaging sensor 11 can be synthesized and processed as an overhead image representing, for example, a state viewed from a virtual viewpoint above the vehicle from which the surroundings of the vehicle can be displayed. Imaging data by the imaging sensor 11 is input to the automatic drive control device 30.

The short distance measurement sensor 12 can include, for example, sonar. The short distance measurement sensor 12 is used to detect a distance to an object near the vehicle 50 by transmitting an ultrasonic wave toward the surroundings of the vehicle 50 and receiving the reflected wave. Distance measurement data by the short distance measurement sensor 12 is input to the automatic drive control device 30.

The middle distance measurement sensor 13 can include, for example, millimeter-wave radar. The middle distance measurement sensor is used to detect a distance to an object by transmitting a high frequency wave called a millimeter wave toward the surroundings of the vehicle 50 and receiving the reflected wave. Distance measurement data by the middle distance measurement sensor 13 is input to the automatic drive control device 30.

The long distance measurement sensor 14 can include, for example, millimeter-wave radar. The long distance measurement sensor 14 is used to detect a distance to a distant object by transmitting a high frequency wave called a millimeter wave toward the front of the vehicle and receiving the reflected wave. The long distance measurement sensor 14 is not limited to millimeter-wave radar, and may include a stereo camera. Distance measurement data by the long distance measurement sensor 14 is input to the automatic drive control device 30.

The travel state acquisition unit 15 functions as means for acquiring the travel state of the vehicle 50 such as position information, travel direction information, and speed information of the vehicle 50, for example. The travel state acquisition unit 15 uses, for example, a global navigation satellite system (GNSS), uses a method called dead reckoning, which is to estimate the own vehicle position using internal sensor information such as a gyro sensor, an acceleration sensor, and a wheel speed sensor (all not illustrated), and calculates the own vehicle position from a relative positional relationship with an object acquired by the imaging sensor 11, the short distance measurement sensor 12, the middle distance measurement sensor 13, and the long distance measurement sensor 14.

The road information acquisition unit 16 acquires, for example, road network information (map information) including nodes and links, traffic rule information, and traffic safety facility information. The road network information includes road structure information such as node detail information (cross, T-junction, and the like) and link detail information (number of lanes, shape, and the like).

The traffic rule information refers to a concept including not only traffic regulations but also traffic manners shared by people. The traffic safety facility information refers to equipment intended to be visually recognized by the driver for traffic safety, such as traffic lights and road signs. The road information acquisition unit 16 may acquire as necessary the information from a storage medium that stores the information, or may acquire as necessary the information from a server on a network via the communication device 20.

The driver operation acquisition unit 17 acquires an input operation of the driver to the vehicle. For example, a steering switch (not illustrated) or a touch operation on a screen of a car navigation device (not illustrated) is used. In addition, the driver operation acquisition unit 17 may acquire a corresponding input operation by reading an expression or a motion of the driver using a driver monitor camera (not illustrated) or reading voice of the driver with a microphone. By a user's operation, the driver operation acquisition unit 17 receives an instruction to store the input information and an instruction to automatically control the vehicle 50.

The communication device 20 is a device that transmits/receives communication from/to the outside, and acquires, for example, road surface information (road surface paint type and position such as lane marker position, stop line position, crosswalk, and the like) and object information (objects existing around the road such as signs, traffic lights, and features) as surrounding environment information of the vehicle 50.

As such surrounding environment information, information detected by a sensor installed in a road infrastructure, road surrounding information (road surface information, object information, and the like) stored in an external data center, and surrounding environment information (road surface information, object information, and the like) detected by another vehicle can also be acquired using the communication device 20.

It is also possible to update the surrounding environment information of the travel route stored in advance to the latest information using the communication device 20. Furthermore, the communication device 20 can acquire various orders for the vehicle transmitted by the owner of the vehicle 50 via a mobile phone, and can transmit the state of the vehicle 50 to the mobile phone used by the owner.

The automatic drive control device 30 performs information processing related to travel assistance. The automatic drive control device 30 mainly includes a computer including a CPU 30A, a CPU 30B, and a storage device 30C.

The CPU 30A causes, for example, a storage start end determination unit 31A, a short-term storage information decision unit 32A, a short-term storage information storage unit 33A, a long-term storage information decision unit 34A, and a long-term storage information storage unit 35A to function.

The CPU 30B causes, for example, a guidance route creation unit 31B, a vehicle control unit 33B, and an own vehicle position recognition unit 32B to function. The CPU 30A and the CPU 30B may be single-core or multi-core.

In addition, the storage device 30C includes a first storage unit 31C (RAM) and a second storage unit 32C (non-volatile memory). The RAM and the non-volatile memory may be built in the same chip for the CPU 30A and the CPU 30B, or may be externally attached.

The storage start end determination unit 31A, the short-term storage information decision unit 32A, the short-term storage information storage unit 33A, the long-term storage information decision unit 34A, and the long-term storage information storage unit 35A are loaded as programs from the second storage unit 32C to the first storage unit 31C and executed by the CPU 30A.

The guidance route creation unit 31B, the vehicle control unit 33B, and the own vehicle position recognition unit 32B are loaded as programs from the second storage unit 32C to the first storage unit 31C and executed by the CPU 30B.

The CPUs 30A and 30B operate as functional units that provide predetermined functions by executing processing according to programs of the functional units. For example, the CPU 30A functions as the long-term storage information decision unit 34A by executing processing according to the long-term storage information decision program. The same applies to other programs. The CPUs 30A and 30B also operate as functional units that provide respective functions of a plurality of processing executed by each program. A computer and a computer system are a device and a system that include these functional units.

Based on various pieces of information input from the input device 10, the automatic drive control device 30 calculates a control command value for controlling travel of the vehicle and outputs the control command value to the output device 40. The control command value mentioned here includes not only control information (acceleration/deceleration control information and steering control information) for changing, via an actuator, a physical state of the vehicle such as traveling, turning, or stopping, but also signal information for providing information to the driver via an indicator 41 (meter or the like) and a voice output device 42 (speaker or the like).

Based on an input operation by the driver acquired from the driver operation acquisition unit 17, the storage start end determination unit 31A determines whether or not there is a start request or end request for a route storing or determines that the vehicle 50 has approached a storage start point and a storage end point having been set in advance by the driver, thereby performing start determination and end determination of route storing.

The storage start end determination unit 31A also performs start determination or end determination of the route storing by detecting an abnormality in the vehicle control device 1 or verifying a free space of the RAM of the first storage unit 31C or the non-volatile memory of the second storage unit 32C. At this time, the storage start end determination unit 31A notifies the driver via the output device 40 that the storage has been started, has been ended, or has failed to be started.

The short-term storage information decision unit 32A calculates the feature degree of the surrounding environment information (object information and road surface information) included in the short-term storage information acquired when the vehicle travels by manual drive using the imaging sensor 11, the short distance measurement sensor 12, the middle distance measurement sensor 13, the long distance measurement sensor 14, or the like.

The short-term storage information decision unit 32A converts the positional relationship of the vehicle 50 input from the short-term storage information and the travel state acquisition unit 15 into a predetermined coordinate system, and decides the short-term storage information to be stored in the first storage unit 31C (RAM).

Here, the short-term storage information is updated from moment to moment according to a predetermined cycle, that is, treated as discrete time data. The data to be stored as the short-term storage information desirably includes information that can be used as a guidance route for automatic drive or automatic parking, and examples thereof include an own vehicle position, a yaw angle, a relative position with respect to an object around the vehicle, an accumulated travel distance from a storage start point, and the like.

The short-term storage information storage unit 33A stores the short-term storage information decided by the short-term storage information decision unit 32A into the first storage unit 31C (RAM). At this time, if other short-term storage information has already been stored in the first storage unit 31C (RAM), the short-term storage information is stored in a free space of the first storage unit 31C (RAM) so as not to be overwritten.

However, when the free space of the first storage unit 31C (RAM) is insufficient, the short-term storage information storage unit 33A decides a predetermined value of the feature degree of the surrounding environment information such as the object and road surface marking based on the travel state information (traveling on a straight line, traveling on a curved line, and the like) of the vehicle 50.

The short-term storage information storage unit 33A deletes the surrounding environment information having the feature degree equal to or less than a predetermined value and secures the free space. In addition, the short-term storage information storage unit 33A can give index information to the short-term storage information and store it into the first storage unit 31C (RAM) so that the order of the short-term storage information to be stored can be determined.

Note that the short-term storage information decision unit 32A and the short-term storage information storage unit 33A may function as short-term storage information processing units.

Based on the short-term storage information that the short-term storage information storage unit 33A has stored in the first storage unit 31C (RAM), the long-term storage information decision unit 34A selects object information on the route and route information that are necessary for a guidance route for automatic drive or automatic parking, and decides them as long-term storage information to be stored in the second storage unit 32C (non-volatile memory).

The long-term storage information storage unit 35A stores the long-term storage information decided by the long-term storage information decision unit 34A into the second storage unit 32C (non-volatile memory). At this time, if long-term storage information regarding another guidance route has already been stored in the second storage unit 32C (non-volatile memory), the long-term storage information is stored in the free space of the second storage unit 32C (non-volatile memory) so as not to be overwritten.

If the free space of the non-volatile memory is insufficient, the long-term storage information storage unit 35A can output, to the output device 40, a signal for notifying the driver of that effect. In addition, the long-term storage information storage unit 35A can give index information to the long-term storage information and store it into the second storage unit 32C (non-volatile memory) so that the order of the long-term storage information to be stored can be determined.

Note that the long-term storage information decision unit 34A and the long-term storage information storage unit 35A may function as long-term storage information processing units.

The guidance route creation unit 31B generates a guidance route for automatic drive or automatic parking from the long-term storage information stored in the second storage unit 32C (non-volatile memory). Generation of a guidance route is executed at the time of automatic travel of the vehicle 50 after route information is stored.

The own vehicle position recognition unit 32B verifies the position of the vehicle 50 at the time of automatic drive. At the time of automatic drive, the own vehicle position recognition unit 32B compares the relative positional relationship between the position of the vehicle 50 and the object stored in the route information generated by the guidance route creation unit 31B with the relative positional relationship between the position of the vehicle 50 and the object calculated by the imaging sensor 11, the short distance measurement sensor 12, the middle distance measurement sensor 13, and the long distance measurement sensor 14 of the input device 10, and determines whether or not the position of the vehicle 50 is traveling on the guidance route.

If the position of the vehicle 50 deviates from the guidance route, the own vehicle position recognition unit 32B collates the actual position of the vehicle 50 with the position of the guidance route, calculates the deviation amount, and outputs the vehicle position correction value.

The vehicle control unit 33B controls the vehicle 50 so as to follow the guidance route generated by the guidance route creation unit 31B. However, it is not always necessary to control the vehicle 50 along the guidance route, and it is desirable to control the vehicle 50 so as to improve the ride comfort of the occupant or to control the vehicle 50 so as to avoid an obstacle if any on the guidance route. In addition, the vehicle is controlled by using the vehicle position correction value generated by the own vehicle position recognition unit 32B.

As illustrated in FIG. 1, the output device 40 includes the indicator 41, the voice output device 42, and various actuators 43. The output device 40 is connected to the automatic drive control device 30, and controls the indicator 41, the voice output device 42, and the various actuators 43 in response to reception of a control command value output from the automatic drive control device 30.

The indicator 41 indicates, to an occupant of the vehicle including the driver, various pieces of information such as a guidance route, a free space of the second storage unit 32C (non-volatile memory), and an overhead image imaged by the imaging sensor 11 described later, and provides visual information such as an image of an image signal from the automatic drive control device 30.

The indicator 41 is, for example, an instrument panel, a display, or the like disposed near the driver's seat of the vehicle. The display may be a head-up display. Alternatively, a mobile phone held by the occupant, a mobile information terminal including a so-called smartphone, a tablet personal computer, or the like may be used as a part or entirety of the indicator 41.

The voice output device 42 provides the occupant of the vehicle including the driver with various pieces of information such as auditory information such as a travel assistance cancellation warning and an announcement of storage start and end. The voice output device 42 is, for example, a speaker or the like disposed near the driver's seat of the vehicle.

The various actuators 43 change a steering angle, acceleration/deceleration, and braking force of the vehicle 50 based on the control command value input from the automatic drive control device 30. The various actuators 43 indicate a mechanical element and a signal conversion device that drive an accelerator pedal that adjusts driving force, a brake pedal that adjusts braking force, a parking brake (not illustrated), a steering wheel (not illustrated) that adjusts the course of the vehicle 50, a shift lever (not illustrated) that operates the travel direction of the vehicle 50, and the like.

Figure 2:
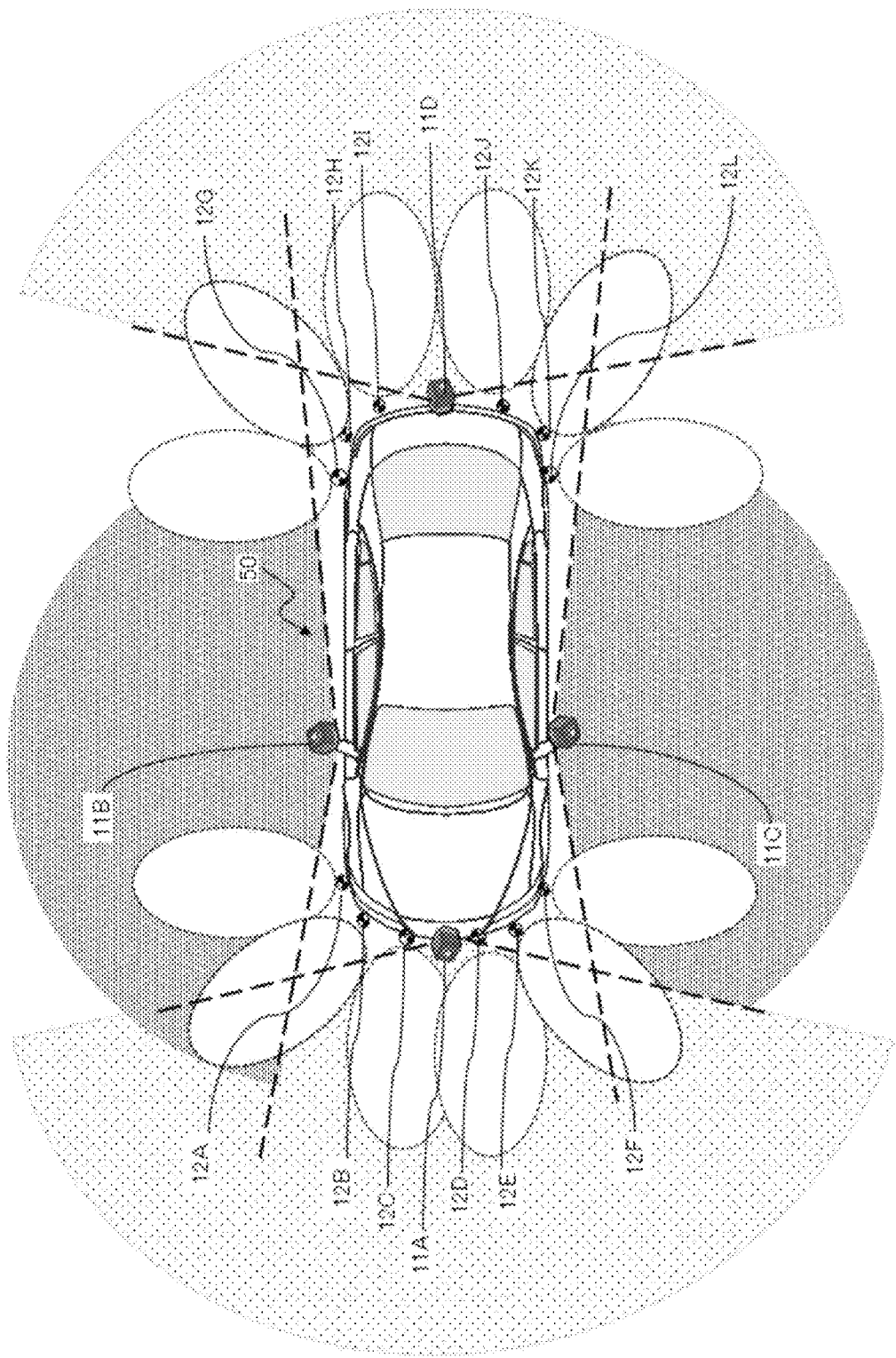
FIG. 2 is a plan view illustrating an embodiment of the present invention and illustrating a recognition region of an imaging sensor and a short distance measurement sensor mounted on a vehicle.

FIG. 2 is a plan view of an example of the arrangement and detection range of the short distance measurement sensors 12 (12A to 12L) and the imaging sensors 11 (11A to 11D) that are mounted on the front, side, and rear of the vehicle 50.

As illustrated in FIG. 2, a total of six short distance measurement sensors 12A, 12B, 12C, 12D, 12E, and 12F are disposed in the front of the vehicle 50, and a total of six short distance measurement sensors 12G, 12H, 12I, 12J, 12K, and 12L are disposed in the rear of the vehicle 50.

The elliptical shape indicated by the broken line in FIG. 2 shows an example of the detection range of each of the short distance measurement sensors 12A to 12L. In addition, the imaging sensor 11A is attached in the front of the vehicle 50, the imaging sensors 11B and 11C are attached to the left and right of the vehicle, and the imaging sensor 11D is attached to the rear of the vehicle 50.

The semicircle indicated by the dotted line in FIG. 2 shows an example of the detection range of each of the imaging sensors 11A to 11D. The vehicle control device 1 can generate an overhead view of the vehicle 50 and the surroundings of the vehicle 50 as viewed from above by converting and combining images imaged by the four imaging sensors 11A to 11D. The overhead view is used when indicated on the indicator 41.

Figure 3:
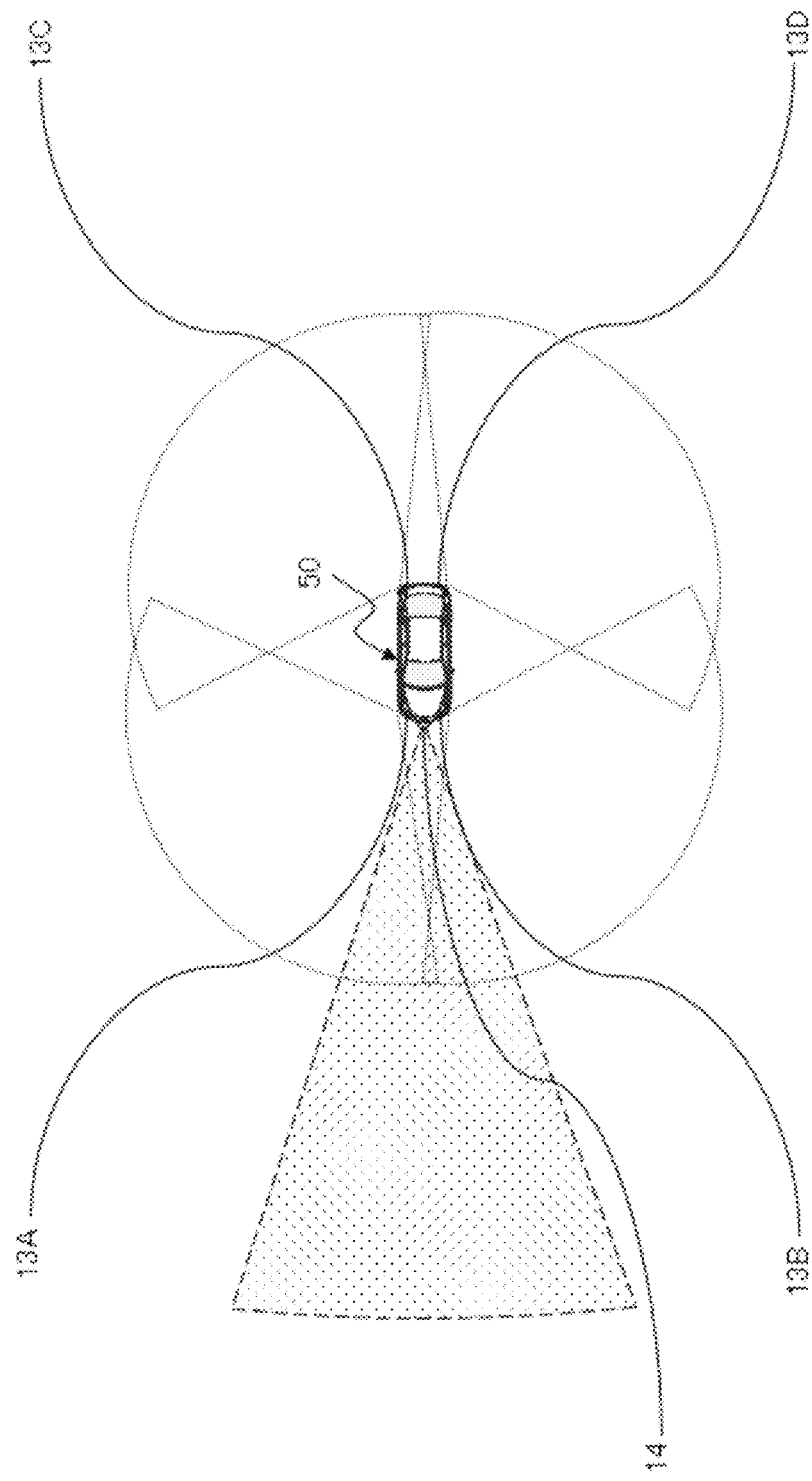
FIG. 3 is a plan view illustrating an embodiment of the present invention and illustrating a recognition region of a middle distance measurement sensor and a long distance measurement sensor mounted on the vehicle.

FIG. 3 is a view of an example of the arrangements and detection ranges of the middle distance measurement sensors 13A to 13D mounted on the front and the rear of the vehicle 50 and the long distance measurement sensor 14 mounted on the front of the vehicle 50.

As illustrated in FIG. 3, the middle distance measurement sensors 13 (13A and 13B) are arranged in the front of the vehicle 50, and the middle distance measurement sensors 13C and 13D are arranged in the rear of the vehicle 50. The fan shape indicated by the dotted line in FIG. 3 shows an example of the detection range of each of the middle distance measurement sensors 13 to 13D. In addition, the long distance measurement sensor 14 is disposed in the front of the vehicle 50. The fan shape indicated by the broken line in FIG. 3 shows an example of the detection range of the long distance measurement sensor 14.

Figure 4:
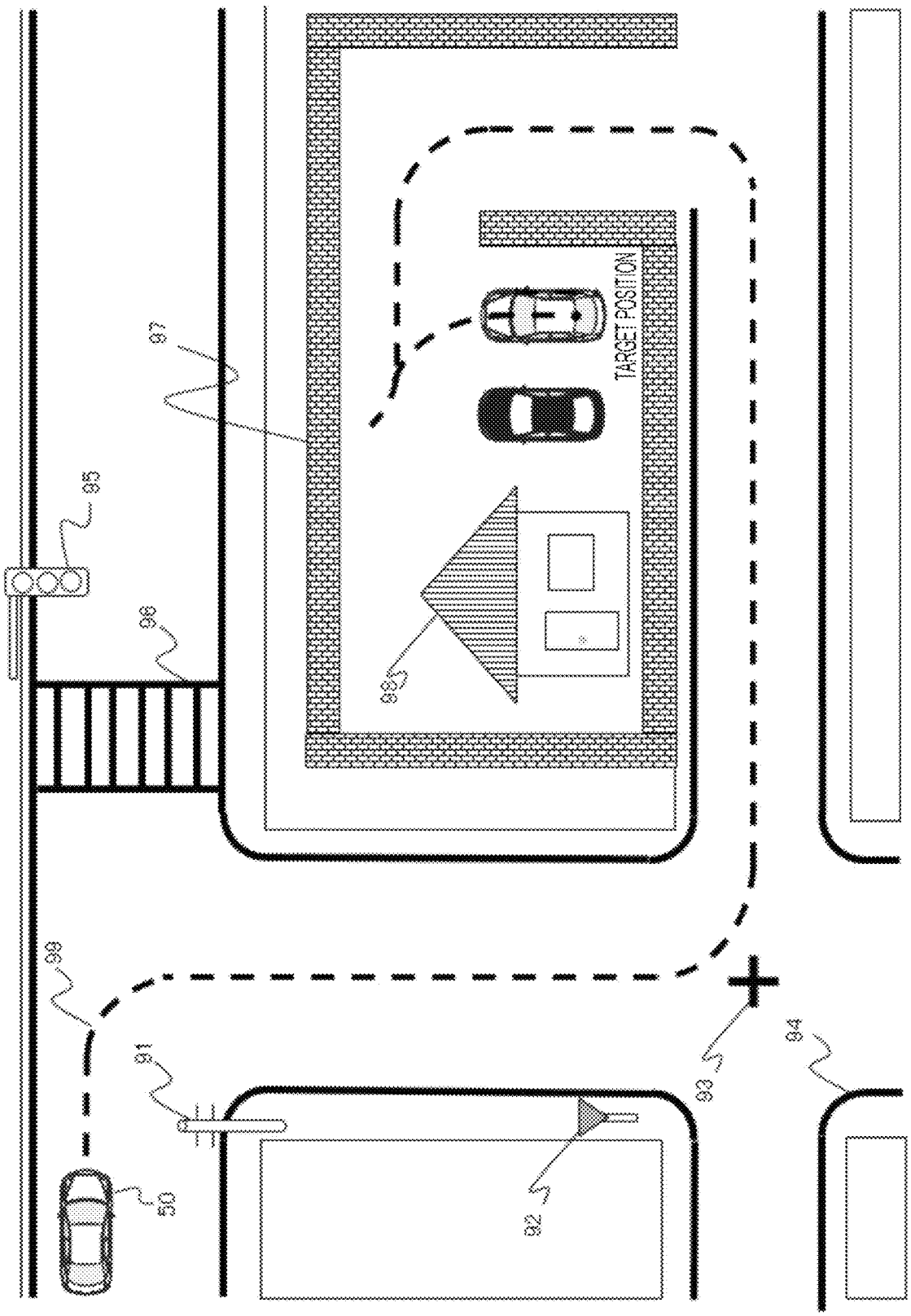
FIG. 4 is a plan view illustrating an embodiment of the present invention and showing an example of a travel environment of the vehicle.

FIG. 4 is a plan view illustrating an example of the travel environment of the vehicle 50 of the present embodiment. In FIG. 4, the vehicle control device 1 stores the short-term storage information and the long-term storage information of the vehicle 50 from the first storage unit 31C to the second storage unit 32C when manual drive is performed. Thereafter, the vehicle control device 1 causes route guidance of automatic drive or automatic parking to be performed on a guidance route 99 generated by the guidance route creation unit 31B by using the long-term storage information stored in the second storage unit 32C. The target position in FIG. 4 indicates a parking position.

For example, in a case where the vehicle 50 manually travels on the guidance route 99 and stores route information, a relative positional relationship between objects such as a utility pole 91, a sign 92, road surface paint 93, a white line 94, a traffic light 95, a crosswalk 96, an outer wall 97, or a building 98 that exist on the side of the road and the vehicle position is recognized by the vehicle sensor.

Mobile objects around the vehicle 50 change from moment to moment, but it is considered that the road surface paint 93, the sign 92 around the road, the traffic light 95, and the like are always present unless changed. Then, the road surface paint 93, the sign 92, and the traffic light 95, which are always present, are calculated as surrounding environment information having a high feature degree, and are stored in the first storage unit 31C as short-term storage information.

In addition, the vehicle control device 1 also calculates the feature degree of objects around the vehicle 50 that are not illustrated, for example, a roadside tree, a guardrail, and the like, and stores it into the first storage unit 31C as short-term storage information.

Figure 5:
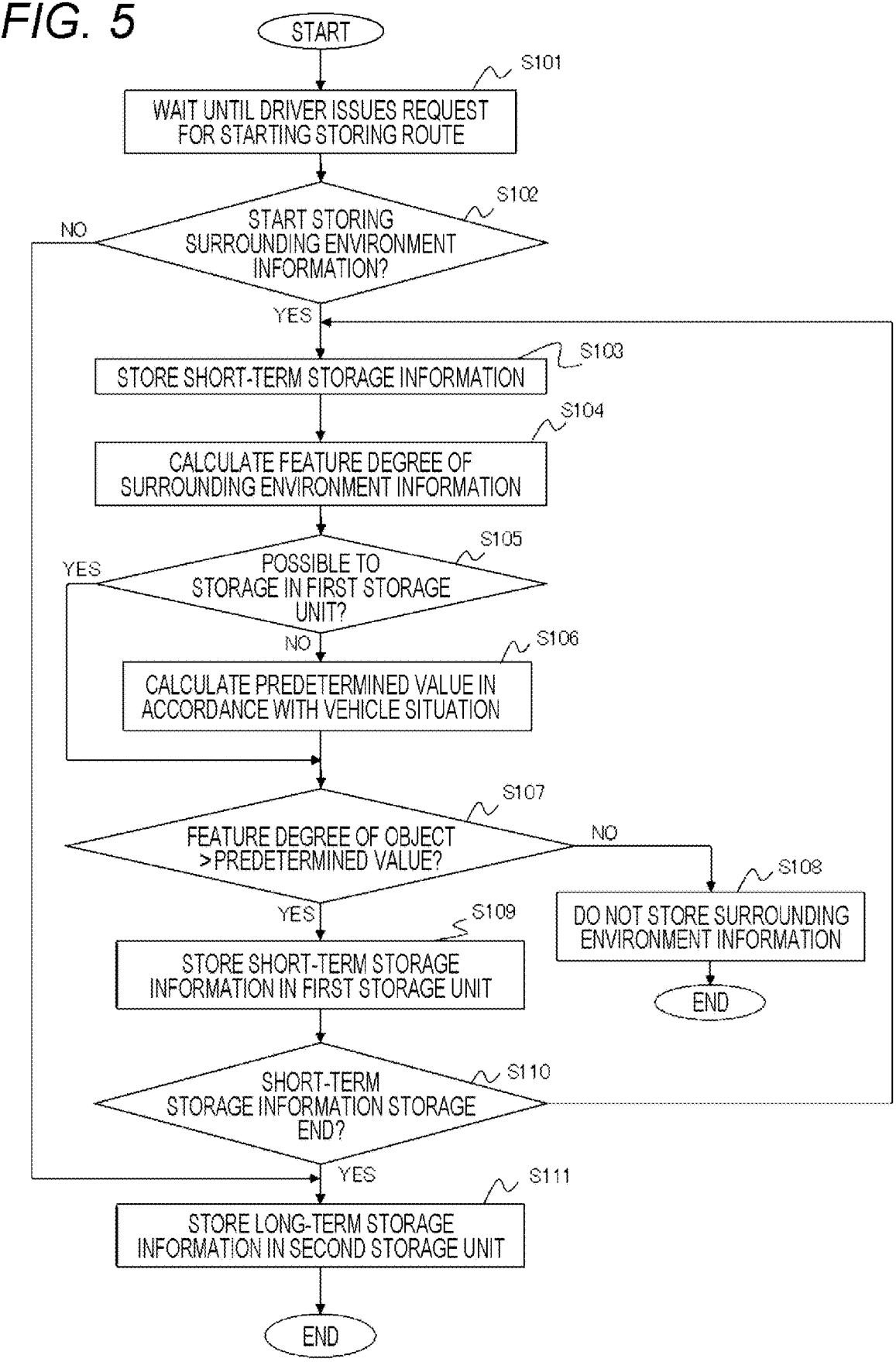
FIG. 5 is a flowchart illustrating an embodiment of the present invention and illustrating an example of processing executed by the vehicle control device at the time of route storing.

FIG. 5 is a flowchart of characteristic processing executed by the vehicle control device 1 when the driver manually drives to store route information. Hereinafter, description will be given with reference to plan views illustrating an example of the travel environment of the vehicle of the present embodiment of FIGS. 4, 6A, 6B, and 7.

In step S101, the storage start end determination unit 31A determines whether or not the driver has detected a route information storage start operation from the driver operation acquisition unit 17. If the driver does not request start of route information storage, the storage is not started, and the storage waits until an input operation from the driver is input. If the storage start end determination unit 31A determines that the driver requests start of storage of the route information, the vehicle control device 1 executes the processing of S102.

In step S102, the storage start end determination unit 31A determines whether or not the vehicle control device 1 can start storage of the route information. The storage start condition is, for example, that the free space of the second storage unit 32C (non-volatile memory) is not insufficient (equal to or more than a capacity threshold), that the vehicle control device 1 has not detected an abnormality, and the like. If the storage start condition is not satisfied, the storage of the route information is not started. If the storage start condition is satisfied, the vehicle control device 1 executes the processing of step S103.

In step S103, the short-term storage information decision unit 32A acquires position information (route information) of the vehicle 50. Thereafter, for example, position information on the earth such as latitude and longitude, object information and road surface information that exist around the route, and surrounding environment information such as relative position information of the position between the object and the vehicle 50 that have been acquired from the input device 10 are stored as short-term storage information.

In step S104, the short-term storage information decision unit 32A calculates the feature degree of the surrounding environment information (object information and road surface information) on the route recognized by the input device 10, and decides the surrounding environment information to be stored and the feature degree as the short-term storage information.

Here, a specific example of calculation of the feature degree in step S104 will be described with reference to FIGS. 6A and 6B.

Figures 6A, 6B:
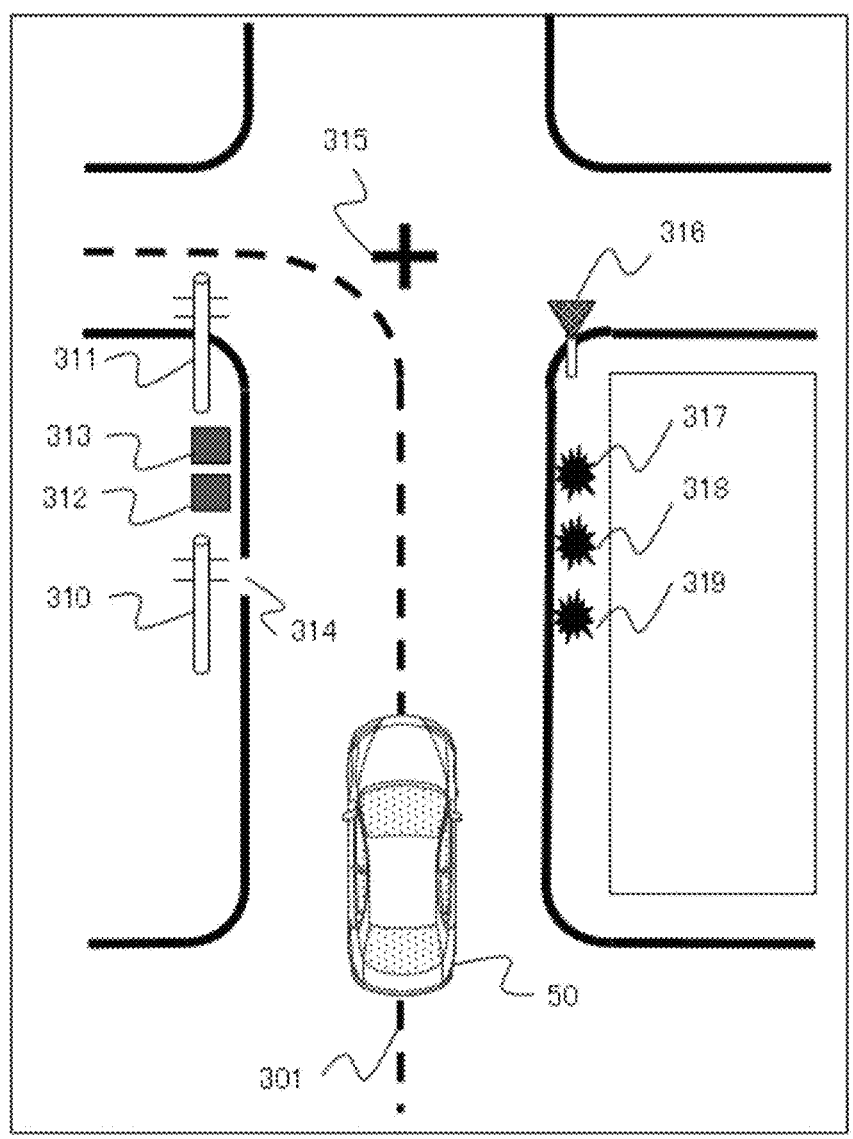
FIG. 6A is a plan view illustrating an embodiment of the present invention and illustrating an example of a travel environment for calculating a feature degree of an object on a route.
FIG. 6B is a view illustrating an embodiment of the present invention and illustrating an example of a calculation result of the feature degree of the object on the route.

FIG. 6A is a plan view illustrating an example of the travel environment in which the vehicle 50 of the present embodiment travels. When the vehicle 50 travels on a travel route 301 (route information) by manual drive while storing short-term storage information, the vehicle control device 1 enters a state of recognizing objects (or road surface markings) 310 to 319 as surrounding environment information on the route by the vehicle sensor of the input device 10.

When objects on the travel route 301 are recognized, the short-term storage information decision unit 32A calculates the feature degree of the objects 310 to 319. As for the feature degree, as shown in Table 350 of surrounding environment information feature degree of FIG. 6B, the feature degree is calculated for each of objects 310 to 319 using indices such as an invariance 351, a color 352, a shape 353, and a total 354 of the feature degrees.

For example, the feature degree of each index is represented by "1" to "3", and the surrounding environment information having a high feature degree is set to "3". Then, the vehicle control device 1 calculates the total 354 of the respective feature degrees of the invariance 351 to the shape 353, and calculates surrounding environment information having a high total 354 of the feature degrees.

In the case of FIG. 6B, it is calculated that the object 316 has the highest feature degree with a total of "9", and the object 315 has the second highest feature degree with a total of "8". Thus, the value of the feature degree of the object on each travel route 301 recognized by the vehicle sensor of the input device 10 is calculated.

In the calculation of the feature degree, the short-term storage information decision unit 32A is only required to calculate the feature amount from the image information of object information and road surface information included in the surrounding environment information, classify the range of the value of the feature amount into a plurality of feature degrees, and give the feature degree according to the feature amount of the surrounding environment information. Note that a publicly-known or well-known technology is only required to be applied to the calculation of the feature amount of the image information, and therefore the description thereof will be omitted.

The feature degree of the invariance 351 is, for example, an index indicating high/low of possibility of existing at the time of the next travel. For example, if the object information recognized by the input device 10 includes a movable shape such as a wheel, the feature degree is set to "1". On the other hand, if the recognized object information has an immovable predetermined shape such as a sign or a utility pole, the feature degree is set to "3". If the recognized object information does not include a movable shape such as a wheel but does not have a predetermined shape, "2" is set.

As for the feature degree of the color 352, for example, the feature degree of a color that is easily recognized at all times by the vehicle sensor of the input device 10 is set high, and the feature degree of a color that is difficult to recognize at night or the like is set low. As for the feature degree of the shape 353, for example, the feature degree of a shape that is easily recognized at all times by the vehicle sensor of the input device 10 is set high, and the feature degree of a shape that is difficult to recognize at night or the like is set low.

Note that in the above, an example has been described in which the short-term storage information decision unit 32A calculates the feature amount from the image information included in the surrounding environment information and gives the feature degree by dividing the feature amount into ranges of three stages, but the present invention is not limited thereto, and evaluation can be performed in further multiple stages or evaluation can be performed with the feature amount.

In step S105, the short-term storage information storage unit 33A determines the storable capacity of the first storage unit 31C, and determines whether or not to be able to store the short-term storage information determined by the short-term storage information decision unit 32A. If able to store, the short-term storage information storage unit 33A continues the storage as it is, and the process proceeds to step S109. If not able to store, the process proceeds to step S106.

In step S106, in order to reduce the short-term storage information to be stored, the short-term storage information storage unit 33A sets a predetermined value of the feature degree of the object according to the vehicle speed, the vehicle travel state (straight travel, turning, and the like), and the like that have been acquired from the travel state acquisition unit 15. The short-term storage information storage unit 33A calculates object information on the travel route 301 having a feature degree equal to or less than a predetermined value.

Here, a specific example of calculation of the predetermined value in step S106 will be described with reference to FIG. 7.

FIG. 7 is a graph illustrating an example of the relationship among the feature degree, the predetermined value, and the position of the object on the travel route 301. FIG. 7 is a view of a graph illustrating the surrounding environment information on the travel route, the feature degree total value of the surrounding environment information on the travel route, the vehicle speed, the travel state of the vehicle 50 such as straight travel (straight travel) and curve travel (turning), and the predetermined value when the vehicle travels while storing short-term storage information by manual drive. As for (P, S, C) of the arrows indicating the surrounding environment information in the figure, P indicates the position (coordinate system) of the surrounding environment information, S indicates the size of the surrounding environment information, and C indicates the color of the surrounding environment information. The X-axis represents the position (distance) from the storage start point to the storage end point, and the Y-axis represents the feature degree.

For example, if the travel route of the vehicle is calculated as a straight travel section from the short-term storage information, the deviation of the own vehicle position at the time of automatic drive is small, and the vehicle position can be corrected with a small number of pieces of surrounding environment information on the travel routes. Therefore, the predetermined value of the feature degree total value is set higher than that at the time of turning, thereby reducing the surrounding environment information on the travel route to be stored.

The case of FIG. 7 is a case where the predetermined value of the feature degree total value is set to "8" in the straight section from a storage start point P0 to a point P1 and the straight section from a point P2 to a point P3.

Next, if the travel route is calculated as a curved travel section from the short-term storage information, there is a possibility that the deviation of the own vehicle position at the time of automatic travel becomes large. Therefore, it is necessary to store a large number of pieces of surrounding environment information on the travel route and accurately correct the vehicle position. Therefore, the predetermined value of the feature degree total value is set low, thereby increasing the surrounding environment information to be stored.

In the case of FIG. 7, the predetermined value of the feature degree total value is set to "6" in the curved section from the point P2 to the point P3. Thus, the vehicle control device 1 calculates the predetermined value of the feature degree total value in accordance with the travel state of the vehicle 50. By setting the predetermined value higher than that at the time of turning if the travel state of the vehicle 50 is straight travel, the vehicle control device 1 reduces the surrounding environment information to be stored. On the other hand, by setting the predetermined value lower than that at the time of traveling straight when the travel state of the vehicle 50 is turning, the vehicle control device 1 increases the surrounding environment information to be stored and ensuring the accuracy of generating route information.

In the case of route guidance of automatic parking, accuracy of the position of the vehicle 50 is necessary from the point P3 to a storage end point P4 of a parking guidance section (near the target parking position) in order to accurately execute automatic parking. If a section is recognized as a parking guidance section, it is necessary to store a large number of pieces of surrounding environment information and accurately correct the own vehicle position. Therefore, the predetermined value of the feature degree total value is set lower than that at the time of turning, thereby increasing the surrounding environment information to be stored.

In the case of FIG. 7, the section from a point before the point P3 to the storage end point P4 is recognized as a parking guidance section, and the predetermined value of the feature degree total value is set to "5". Note that the point P3 is only required to be set within a predetermined distance from the storage end point P4 (target point).

In step S107, the short-term storage information storage unit 33A extracts the surrounding environment information on the travel route in which the total value 354 of the feature degrees has become a value equal to or greater than the predetermined value set in step S106. In the case of the surrounding environment information on the travel route in which the feature degree total value has become equal to or greater than the predetermined value, the process proceeds to step S109. In the case of the surrounding environment information on the travel route in which the feature degree total value has become equal to or less than the predetermined value, the process proceeds to step S108, and it is not stored as the surrounding environment information on the travel route.

In step S109, the short-term storage information storage unit 33A stores, into the first storage unit 31C, short-term storage information including the surrounding environment information on the travel route determined to be stored in step S107.

In step S110, the storage start end determination unit 31A determines whether or not storage of short-term storage information has ended. The storage end condition includes, for example, that the vehicle 50 has reached a target point (storage end point), that the driver has issued a storage end request, that a shift range has been operated to parking, that the parking brake has been operated, and the like.

In step S110, in a case where the storage start end determination unit 31A determines that the storage of the short-term storage information has not ended, the process returns to step S103. If it is determined that the storage of the route information has ended, the vehicle control device executes step S111.

In step S111, the long-term storage information decision unit 34A calculates, from the stored short-term storage information, route information necessary for the guidance route for automatic drive or automatic parking and surrounding environment information on the travel route. The long-term storage information decision unit 34A causes the long-term storage information storage unit 35A to store, into the second storage unit 32C, short-term storage information including the calculated surrounding environment information on the travel route.

Regarding the route information necessary for the guidance route and the surrounding environment information on the travel route, for example, if the travel route is straight, the guidance route can be generated if there are route information (positions) of a start point and an end point of the straight line and the surrounding environment information at the position. Due to this, the long-term storage information decision unit 34A stores, as the long-term storage information into the second storage unit 32C, information in which the route information in the straight section and the surrounding environment information on the travel route among the short-term storage information in the first storage unit 31C are reduced.

By the above processing, the vehicle control device 1 calculates surrounding environment information having a high feature degree, and decides a predetermined value of the feature degree in order to select the surrounding environment information according to the travel state of the vehicle. Then, since the vehicle control device 1 does not store surrounding environment information having a feature degree of equal to or less than the predetermined value, the data size of the surrounding environment information stored in the storage device 30C can be reduced as compared with a case where the invention is not applied. This can prevent the capacity of the storage device 30C to be mounted on the vehicle control device 1 from increasing, and can prevent the manufacturing cost from increasing.

Figure 8:
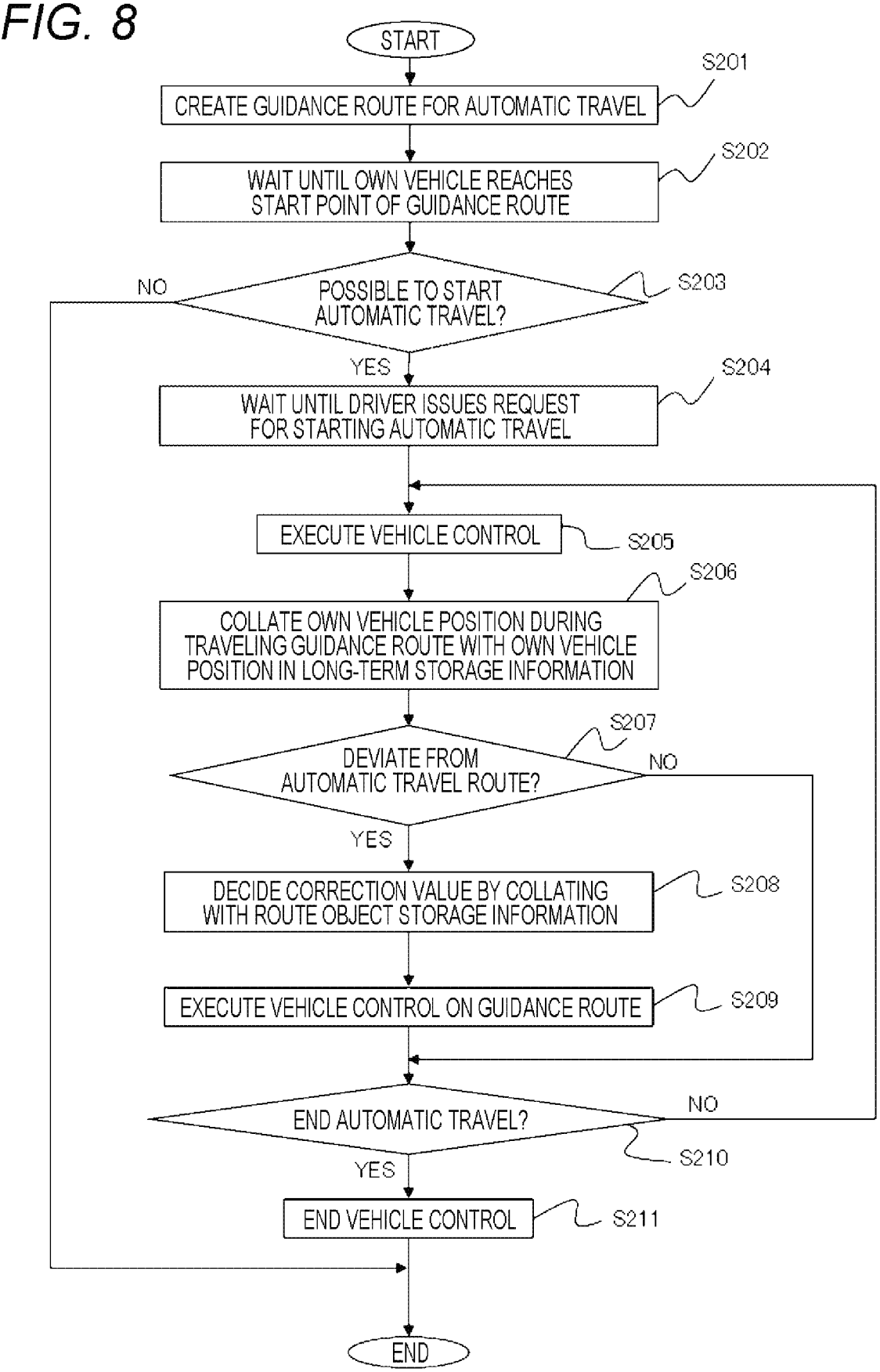
FIG. 8 is a flowchart illustrating an embodiment of the present invention and illustrating an example of processing executed by the vehicle control device at the time of automatic travel.

FIG. 8 is a flowchart illustrating an example of characteristic processing executed by the vehicle control device 1 when the vehicle control device 1 performs automatic travel. Hereinafter, description will be given with reference to plan views illustrating an example of the travel environment of the vehicle 50 of the present embodiment of FIGS. 4, 9A, and 9B.

Here, it is assumed a scene in which the driver approaches a start point (storage start point) of the stored route information while manually traveling the vehicle. The driver determines the switching timing from manual travel to automatic travel.

In step S201, the guidance route creation unit 31B generates a guidance route for automatic travel from the long-term storage information stored in the second storage unit 32C. In a case of using a large number of calculation resources for generation of the guidance route, it is desirable to execute the processing immediately after power is supplied to the vehicle control device 1.

In step S202, the vehicle control unit 33B determines whether or not the vehicle 50 has reached the start point (storage start point) of the guidance route. Regarding the determination method, for example, the position information of the vehicle 50 acquired from the travel state acquisition unit 15 of the input device 10 or the like and the position information on the guidance route of the long-term storage information are compared, or the object information on the travel route (surrounding environment information) acquired by the vehicle sensor of the input device 10 and the object information on the travel route of the long-term storage information are compared.

If it is determined that the vehicle has reached the start point (storage start point) of the guidance route, the processing of step S203 is executed. If it is determined that the vehicle 50 has not yet approached the start point (storage start point) of the guidance route, the processing in this step is repeatedly executed.

In step S203, the vehicle control unit 33B determines whether or not to be able to start automatic travel. The start condition of automatic travel is, for example, that the vehicle control device 1 has not detected an abnormality. If the start condition of automatic travel is not satisfied, the automatic travel is not started. If the start condition of the automatic travel is satisfied, the vehicle control device executes the processing of step S204.

In step S204, the vehicle control unit 33B notifies the driver that automatic travel is possible. After notifying, the vehicle control unit 33B acquires input information from the driver operation acquisition unit 17, and determines whether or not the driver has requested start of automatic travel. If the driver has not requested start of automatic travel, the vehicle control unit 33B does not start the automatic travel, and waits until the next input operation from the driver comes.

Note that since the driver manually travels the vehicle at the time of start of automatic travel, the vehicle control unit 33B desirably performs an input operation by a steering switch (not illustrated), an input operation by voice, or an input operation by a driver monitor camera (not illustrated). When determining that the driver requests the start of the automatic travel, the vehicle control unit 33B executes the processing of S205.

In step S205, the vehicle control unit 33B controls the vehicle so as to follow the calculated guidance route.

In step S206, when the vehicle 50 travels on the guidance route, the own vehicle position recognition unit 32B determines whether or not the vehicle is traveling on the guidance route by collating the relative positional relationship between the surrounding environment information on the travel route acquired by the vehicle sensor of the input device 10 and the position of the vehicle 50 with the relative positional relationship between the surrounding environment information on the travel route present in the guidance route information generated by the guidance route creation unit 31B and the position of the vehicle 50.

In step S207, the own vehicle position recognition unit 32B determines whether or not the position of the vehicle 50 deviates from the guidance route as a result of the collation in step S206. If the position of the vehicle 50 deviates from the guidance route, the process proceeds to S208. If not, the process proceeds to step S210.

In step S208, the own vehicle position recognition unit 32B calculates the deviation amount from the guidance route using the result of the relative positional relationship of the position of the vehicle 50 collated in step S206, and calculates a correction value of the position of the vehicle 50.

In step S209, the own vehicle position recognition unit 32B inputs the correction value calculated in step S208 into the vehicle control unit 33B. The vehicle control unit 33B controls the position of the vehicle 50 so as to travel on the guidance route.

Here, a specific example of calculation of the correction value of the position of the vehicle 50 and vehicle control in steps S208 and S209 will be described with reference to FIGS. 9A and 9B.

Figure 9A:
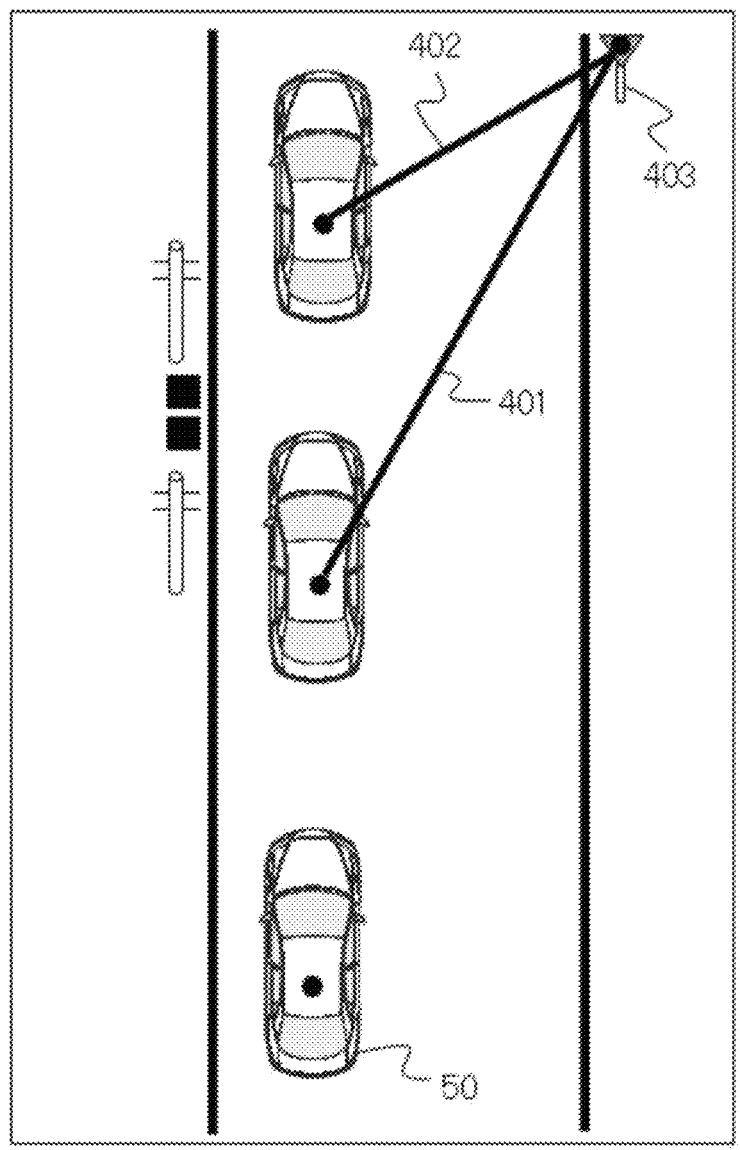
FIG. 9A is a plan view illustrating an embodiment of the present invention and illustrating an example of a travel environment for storing a relative positional relationship between surrounding environment information and a position of a vehicle in manual drive.
Figure 9B:
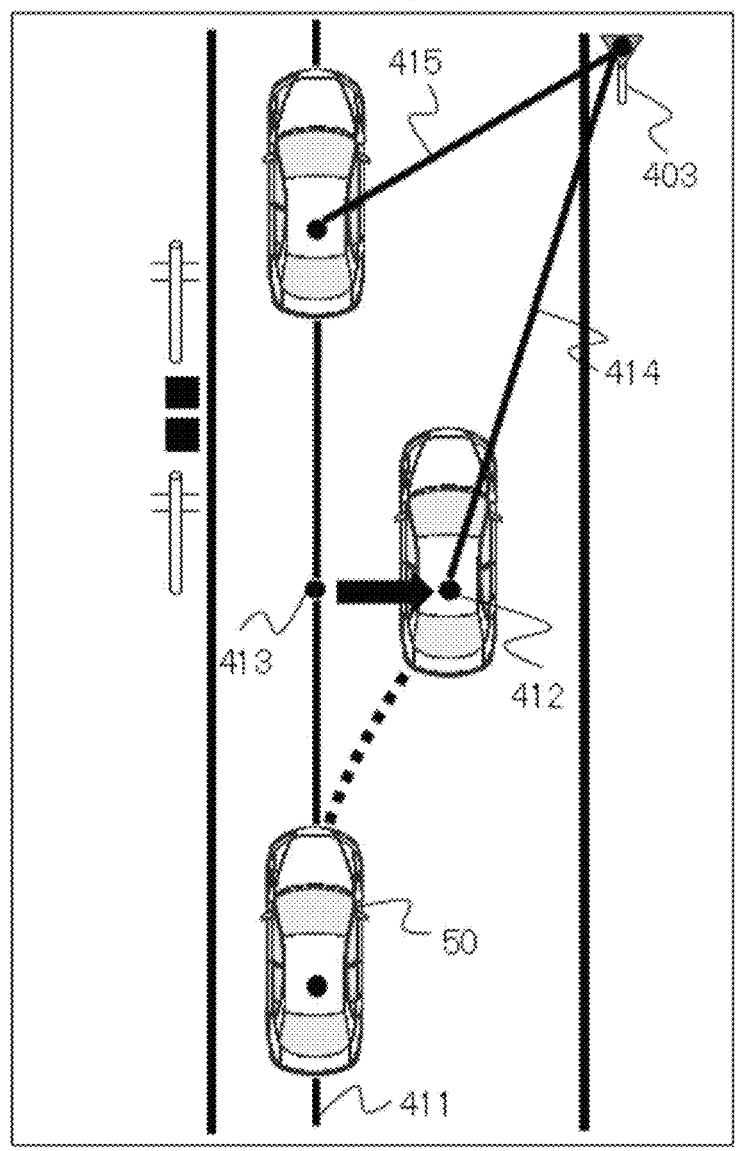
FIG. 9B is a plan view illustrating an embodiment of the present invention and illustrating an example of a travel environment for collating a relative positional relationship between surrounding environment information and a position of a vehicle in automatic travel.

FIGS. 9A and 9B are plan views illustrating an example of the travel environment of the vehicle 50, and illustrate a case where the relative positional relationship between the surrounding environment information and the position of the vehicle 50 is stored in manual travel (FIG. 9A) and a case where the relative positional relationship between the surrounding environment information and the position of the vehicle 50 is collated in automatic travel (FIG. 9B).

For example, in FIG. 9A, there is the vehicle 50 traveling in manual drive in the upper part of the drawing at the time of route storing. In this case, it is assumed that the relative positional relationship between an object 403 and the position of the vehicle 50, a relative position 401, and a relative position 402 are stored.

Next, in FIG. 9B, there is the vehicle 50 automatically traveling on a stored guidance route 411 after storing the route information. The vehicle has been traveling in automatic travel on a similar guidance route, but deviated from the guidance route due to some influence. At that time, the relative positional relationship has been calculated as a relative position 414 at a position of the vehicle 50 that is supposed to be the relative position 401 of the object 403 and the vehicle 50 in FIG. 9A.

Therefore, since route deviation from the guidance route 411 has been determined, the vehicle control device 1 calculates a correction value for returning the position of the vehicle 50 to the guidance route 411. Specifically, the own vehicle position recognition unit 32B calculates a correction value for correcting an own vehicle position 412 deviating from the route to an own vehicle position 413 on the guidance route. Next, as for the own vehicle position correction value, vehicle control is performed by outputting a control amount from the own vehicle position recognition unit 32B to the vehicle control unit 33B.

In FIG. 9B, vehicle control is performed such that the own vehicle position of the relative position 402 (FIG. 9A) at the time of route storing and the relative position 415 (FIG. 9B) at the time of automatic travel become the same, and the own vehicle position is controlled such that the vehicle 50 automatically travels on the guidance route 411.

In step S210, the vehicle control unit 33B determines whether or not to end automatic travel. The end condition of automatic travel includes, for example, that the vehicle 50 has reached the end point (storage end point) of the guidance route, that the driver has issued an end request of automatic travel, and the like. If the end condition of automatic travel is satisfied, the processing of step S211 is executed. If the end condition of automatic travel is not satisfied, the process returns to step S205, and control of the vehicle is continuously executed.

In step S211, the vehicle control unit 33B ends the control of the vehicle and ends the automatic travel. At this time, if the vehicle 50 is stopped at the parking position, the parking brake and the side brake are automatically operated. If the vehicle 50 is traveling, it is desirable to notify the driver that the automatic travel ends, and gradually switch to manual traveling.

FIG. 9B, which is about calculation of a correction value of the position of the vehicle 50 and vehicle control, explains a relative relationship between one object on the travel route and the own vehicle position in steps S208 and S209. However, the position of the vehicle 50 may be corrected based on the relative positional relationship between a plurality of objects on the travel route and the own vehicle position. A specific example will be described with reference to FIGS. 10A and 10B.

Figure 10A:
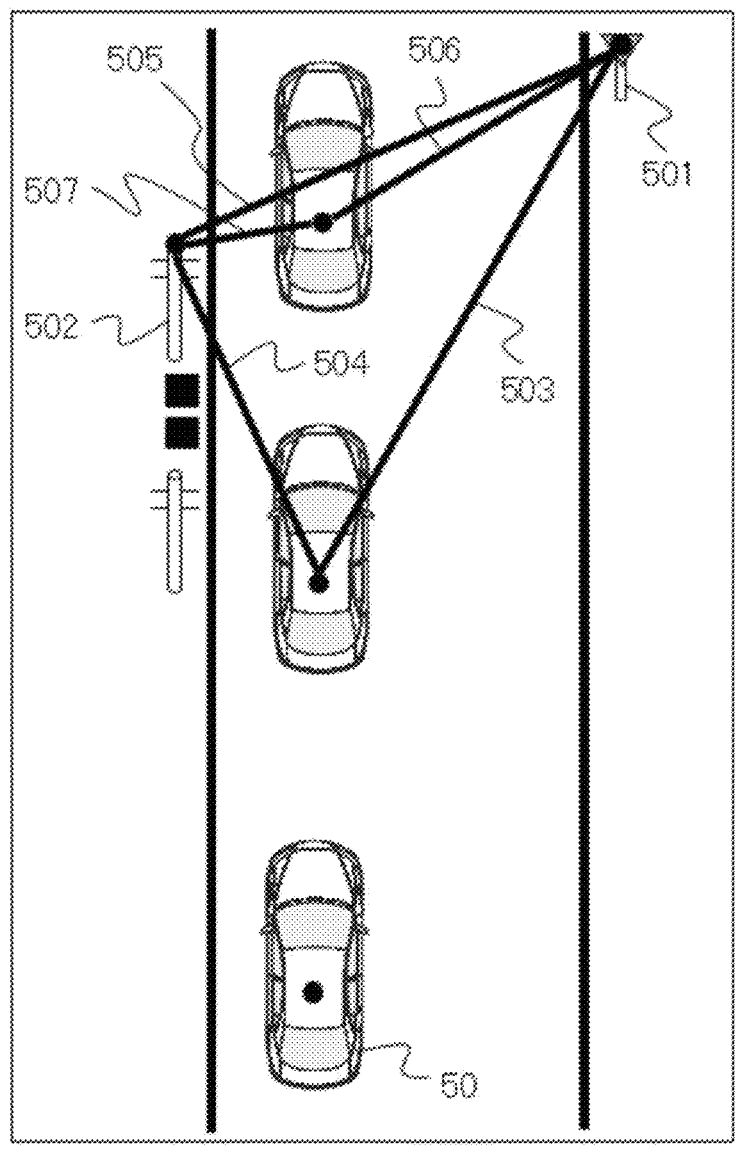
FIG. 10A is a plan view illustrating an embodiment of the present invention and illustrating an example of a case where the vehicle control device performs vehicle position correction from a plurality of pieces of surrounding environment information on a route.

FIGS. 10A and 10B are plan views illustrating an example of the travel environment of the vehicle 50, and illustrate a case where the relative positional relationship between a plurality of pieces of surrounding environment information (501 and 502) and the position of the vehicle 50 is stored in manual travel (FIG. 10A), and a case where the relative positional relationship between a plurality of pieces of surrounding environment information and the position of the vehicle 50 is collated in automatic travel (FIG. 10B).

For example, in FIG. 10A, there is the vehicle 50 traveling in manual operation in the upper part of the drawing at the time of route storing. In this case, it is assumed that the vehicle control device 1 stores a relative position 503, a relative position 504, and a relative position 507 as the relative positional relationship among the surrounding environment information 501, the surrounding environment information 502, and the position of the vehicle 50.

Next, in FIG. 10B, there is the vehicle 50 automatically traveling on a stored guidance route 511 after route storing. The vehicle 50 has been traveling in automatic travel on the guidance route 511, but deviated from the guidance route 511 due to some influence.

At that time, as the relative positional relationship among the surrounding environment information 501, the surrounding environment information 502, and the position of the vehicle 50, the relative positional relationship has been calculated as a relative position 512, a relative position 513, and a relative position 514 at a position (516) of the vehicle 50 where the relative positional relationship is supposed to be the relative position 503, the relative position 504, and the relative position 505 in FIG. 10A.

Since the route deviation from the guidance route 511 has been determined, the vehicle control device 1 calculates a correction value for returning the position of the vehicle 50 to the guidance route 511. Specifically, the own vehicle position recognition unit 32B calculates a correction value for correcting an own vehicle position 515 deviating from the route to an own vehicle position 516 on the guidance route. Next, as for the own vehicle position correction value, vehicle control is performed by outputting a control amount from the own vehicle position recognition unit 32B to the vehicle control unit 33B.

In FIG. 10B, vehicle control is performed such that the own vehicle position of the relative position 505, the relative position 506, and the relative position 507 at the time of route storing, and the relative position 514, the relative position 517, and the relative position 518 at the time of automatic travel become the same, and the own vehicle position is controlled such that the vehicle 50 automatically travels on the guidance route 511. Thus, by executing own vehicle position correction with a plurality of pieces of object information on the travel route, the vehicle control device 1 can perform own vehicle position correction having higher accuracy than that of own vehicle position correction with one object on the travel route.

According to the embodiment of the present invention explained above, when route information is stored in manual travel, the feature degree total value is calculated from a feature degree of the surrounding environment information, a predetermined value (threshold) is calculated with a travel state, and only necessary information among the surrounding environment information on the travel route at the time of automatic travel can be stored. By storing only the necessary surrounding environment information on the travel route into the first storage unit, it is possible to reduce the capacity of the storage device.

Although the preferred embodiments of the present invention have been described, the present invention is not limited to the above-described embodiments at all, and various modifications can be made without departing from the gist of the present invention.

Note that the first storage unit 31C may be a non-volatile storage medium capable of random access. In this case, since the vehicle control device 1 can hold short-term storage information even if the power is cut off after the vehicle reaches the storage end point, the processing of selecting long-term storage information may be executed after the next ignition key is turned on after the power is cut off.

CONCLUSIONS

As described above, the vehicle control device 1 of the above embodiment can have the following configuration.

(1) A vehicle control device (1) that includes a processor (30A, 30B), a first storage unit (31C), and a second storage unit (32C), and stores route information to a target point (storage end point P4), the vehicle control device (1), including: an input device (10) that acquires route information of a vehicle (50) and surrounding environment information around the vehicle (50); and a short-term storage information processing unit that stores the route information and the surrounding environment information acquired while the vehicle (50) is traveling into the first storage unit (31C) as short-term storage information (short-term storage information decision unit 32A and short-term storage information storage unit 33A), in which the short-term storage information processing unit (32A, 33A) calculates a feature degree of the surrounding environment information when storing the route information, and temporarily stores the surrounding environment information in which the feature degree is equal to or greater than a predetermined value into the first storage unit (31C) as the short-term storage information.

With the above configuration, the vehicle control device 1 calculates surrounding environment information having a high feature degree, and decides a predetermined value of the feature degree in order to select the surrounding environment information according to the travel state of the vehicle. Then, since the vehicle control device 1 does not store surrounding environment information having a feature degree of equal to or less than the predetermined value, the data size of the surrounding environment information stored in the storage device 30C can be reduced. This can prevent the capacity of the storage device 30C to be mounted on the vehicle control device 1 from increasing, and can prevent the manufacturing cost from increasing.

(2) The vehicle (50) control device according to (1) above, in which the short-term storage information processing unit (32A, 33A) sets, as the short-term storage information, a position of the vehicle (50) included in the route information, a relative positional relationship of the surrounding environment information, and a feature degree of the surrounding environment information.

With the above configuration, by storing the relative positional relationship of the surrounding environment information and the position of the vehicle (50), the vehicle control device 1 can determine whether or not the vehicle 50 has deviated from the guidance route based on the relative positional relationship of the surrounding environment information at the time of automatic travel.

(3) The vehicle (50) control device according to (1) above, in which the short-term storage information processing unit (32A, 33A) sets, as the short-term storage information, a position of the vehicle (50) included in the route information, a relative positional relationship of a plurality of pieces of the surrounding environment information, and the feature degree of the surrounding environment information.

With the above configuration, by storing the plurality of pieces of surrounding environment information and the position of the vehicle (50), the vehicle control device 1 can accurately determine whether or not the vehicle 50 has deviated from the guidance route based on the relative positional relationship of the plurality of pieces of surrounding environment information at the time of automatic travel.

(4) The vehicle (50) control device according to any one of (1) to (3) above, in which the input device includes a travel state acquisition unit that acquires a travel state of the vehicle (50), and the short-term storage information processing unit (32A, 33A) sets the predetermined value lower in the travel state than in straight travel when the travel state is turning.

With the above configuration, by setting the predetermined value in a curved section as compared with a straight section of the travel route, the vehicle control device 1 can increase the short-term storage information to be stored, and can secure the accuracy at the time of generation of the guidance route.

(5) The vehicle (50) control device according to any one of (1) to (3) above, further including a long-term storage information processing unit (long-term storage information decision unit 34A and long-term storage information storage unit 35A) that decides long-term storage information to be stored into the second storage unit (32C) from among the short-term storage information stored in the first storage unit (31C) and stores the long-term storage information into the second storage unit (32C).

With the above configuration, the vehicle control device 1 can store into the second storage unit (32C) short-term storage information necessary for generating guidance route from among the short-term storage information stored temporarily in the first storage unit (31C).

(6) The vehicle (50) control device according to (5) above, further including a vehicle control unit (33B) that generates guidance route information from the long-term storage information stored in the second storage unit and controls the vehicle (50) based on the guidance route.

With the above configuration, the vehicle control unit 33B can perform automatic travel and automatic parking along the guidance route generated from the long-term storage information.

(7) In the vehicle (50) control device according to (4) above, in which the short-term storage information processing unit (32A, 33A) sets the predetermined value low if the route information is within a predetermined distance from the target point (storage end point P4).

With the above configuration, the vehicle control device 1 can increase the route information and the surrounding environment information that are stored as short-term storage information near the target point that becomes a parking position, and can secure the accuracy at the time of generation of the guidance route.

(8) The vehicle (50) control device according to (7) above, in which the short-term storage information processing unit (32A, 33A) sets the predetermined value lower than that at a time of turning if the route information is within a predetermined distance from the target point.

With the above configuration, the vehicle control device 1 can increase the route information and the surrounding environment information that are stored as short-term storage information near the target point that becomes a parking position more than those at the time of turning, and can secure the accuracy at the time of generation of the guidance route.

The present invention is not limited to the embodiments described above, and includes various modifications. For example, the embodiments described above have been described in detail for the purpose of explaining the present invention in an easy-to-understand manner, and are not necessarily limited to those having all the configurations described above. A part of the configuration of a certain embodiment can be replaced by the configuration of other embodiments, and the configuration of other embodiments can be added to the configuration of a certain embodiment. For a part of the configuration of each embodiment, any of addition, deletion, and substitution of other configurations can be applied alone or in combination.

Some or all of the above-described configurations, functions, processing units, processing means, and the like may be implemented by hardware by being designed as an integrated circuit or the like. The above-described configurations, functions, and the like may be implemented by software by a processor interpreting and executing a program that implements each function. Information such as programs, tables, and files that implement each function can be stored in a recording device such as a memory, a hard disk, and a solid state drive (SSD), or a recording medium such as an IC card, an SD card, and a DVD.

For control lines and information lines, those considered necessary for explanation are illustrated. Not necessarily all the control lines and information lines in the product are illustrated. In practice, almost all configurations may be considered interconnected.

REFERENCE SIGNS LIST

1 vehicle control device
10 input device
30 automatic drive control device
40 output device
30A, 30B CPU
30C storage device
50 vehicle
10 input device
11 imaging sensor
12 short distance measurement sensor
13 middle distance measurement sensor
14 long distance measurement sensor
15 travel state acquisition unit
16 road information acquisition unit
17 driver operation acquisition unit
30 automatic drive control device
31A storage start end determination unit
32A short-term storage information decision unit
33A short-term storage information storage unit
34A long-term storage information decision unit
35A long-term storage information storage unit
31B guidance route creation unit
32B own vehicle position recognition unit
33B vehicle control unit
31C first storage unit
32C second storage unit
40 output device
50 vehicle

The invention claimed is:

1. A vehicle control device that includes a processor, a storage device including a first storage, and a second storage, and stores a route information for a route of a vehicle to a target point, the vehicle control device comprising:
an input device that acquires the route information of the vehicle and a surrounding environment information around the vehicle, the surrounding environment information comprising an object information and a road surface information around the route of the vehicle;

a short-term storage information circuit that stores the route information and the surrounding environment information acquired while the vehicle is traveling into the first storage as short-term storage information;

a long-term storage information circuit that decides long-term storage information to be stored into the second storage from among the short-term storage information stored in the first storage unit and stores the long-term storage information into the second storage, the decision based upon a calculation by the long-term storage information circuit of a guidance route for automatic drive or automatic parking from the route information and the surrounding environment information; and a vehicle control circuit that generates guidance route information from the long-term storage information stored in the second storage and controls the vehicle based on the guidance route information, wherein the short-term storage information circuit calculates a feature degree of the surrounding environment information when storing the route information, the calculated feature degree based upon indices of the object information, the indices of the object information comprising an invariance indicating a probability of an identified object existing at a time of a next travel of the vehicle, and extracts and temporarily stores a portion of the surrounding environment information in which the feature degree is equal to or greater than a predetermined value into the first storage as the short-term storage information, and wherein a data size of the surrounding environment information to be stored in the short-term storage is reduced based upon the predetermined value of the feature degree of the surrounding environment information.

2. The vehicle control device according to claim 1, wherein the short-term storage information circuit sets, as the short-term storage information, a position of the vehicle included in the route information, a relative positional relationship of the surrounding environment information, and the feature degree of the surrounding environment information.

3. The vehicle control device according to claim 1, wherein the short-term storage information circuit sets, as the short-term storage information, a position of the vehicle included in the route information, a relative positional relationship of a plurality of pieces of the surrounding environment information, and the feature degree of the surrounding environment information.

4. The vehicle control device according to claim 1, wherein the input device performs a travel state acquisition function that acquires a travel state of the vehicle, and the short-term storage information circuit sets the predetermined value lower in the travel state than in straight travel when the travel state is turning.

5. The vehicle control device according to claim 4, wherein the short-term storage information circuit sets the predetermined value low if the route information is within a predetermined distance from the target point.

6. The vehicle control device according to claim 5, wherein the short-term storage information circuit sets the predetermined value lower than a predetermined value in the turning if the route information is within a predetermined distance from the target point.

7. The vehicle control device according to claim 1, wherein the indices of the object information further comprise a color or a shape of the object, the color or the shape associated to an ability of the input device to acquire the object information of the vehicle.

* * * * *